(12) United States Patent
Adams et al.

(10) Patent No.: US 8,942,654 B2
(45) Date of Patent: *Jan. 27, 2015

(54) SYSTEM AND METHOD FOR CONTROLLING ANTENNA TUNING USING AN AUXILIARY CHANNEL OF AN EMBEDDED DISPLAY PORT INTERFACE

(71) Applicant: Dell Products, LP, Round Rock, TX (US)

(72) Inventors: Joel Adams, Austin, TX (US); David Douglas, Austin, TX (US); Eugen Munteanu, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/734,599

(22) Filed: Jan. 4, 2013

(65) Prior Publication Data
US 2013/0122838 A1    May 16, 2013

Related U.S. Application Data

(63) Continuation of application No. 12/912,195, filed on Oct. 26, 2010, now Pat. No. 8,369,808.

(51) Int. Cl.
*H04B 1/18* (2006.01)
*H04B 1/38* (2006.01)
(Continued)

(52) U.S. Cl.
CPC ........ *H04B 1/1638* (2013.01); *G06T 2211/408* (2013.01); *G06T 11/008* (2013.01)
USPC ......... 455/193.1; 455/558; 455/66.1; 455/77; 455/556.1

(58) Field of Classification Search
CPC .................................................. H04B 1/1638
USPC ................................ 455/550.1, 566, 567, 557
See application file for complete search history.

(56) References Cited

U.S. PATENT DOCUMENTS 7,676,243 B2 *  3/2010  Leinonen et al. .......... 455/550.1
7,773,956 B2 *  8/2010  Fukamachi et al. ............ 455/78
(Continued)

OTHER PUBLICATIONS

"OBID i-scan® Dynamic Antenna Tuning Board," ID ISC.DAT, OBID®—RFID by FEIG Electronic, 2005, http://web1.giotextag.com/GiotexPortal/pdf.html?pdfId=89.
(Continued)

*Primary Examiner* — Tilahun B Gesesse
(74) *Attorney, Agent, or Firm* — Larson Newman, LLP (57) ABSTRACT

An information handling system includes a capacitor, an antenna, a wireless wide area network card, an embedded display port interface, and a digital-to-analog converter. The capacitor has a variable capacitance that varies based on a voltage applied to the capacitor. The antenna is coupled to the capacitor, and has a variable resonance frequency that is based on the variable capacitance. The wireless wide area network card is in communication with the antenna, and is configured to set the variable resonance frequency to a specific frequency based on a control signal. The embedded display port interface is configured to transmit the control signal from the wireless wide area network card to a display control circuit via an auxiliary channel of the embedded display port interface. The digital-to-analog converter is in communication with the display control circuit, and is configured to provide the voltage to the capacitor in response to a signal from the display control circuit.

20 Claims, 4 Drawing Sheets

(51) Int. Cl.
*H04B 1/40* (2006.01)
*H04B 7/00* (2006.01)
*H04B 1/16* (2006.01)
*G06T 11/00* (2006.01)

(56) References Cited

U.S. PATENT DOCUMENTS 7,821,467 B2 * 10/2010 Sugiyama ................... 343/745
8,249,678 B2 * 8/2012 Abe et al. .................. 455/575.5
2008/0106476 A1 * 5/2008 Tran et al. ................... 343/702
2009/0051610 A1 * 2/2009 Sugiyama ................... 343/745
2009/0111379 A1 * 4/2009 Abe et al. .................... 455/41.2
2011/0122044 A1 * 5/2011 Sathath ........................ 343/861
2012/0099020 A1 4/2012 Adams et al.

OTHER PUBLICATIONS

"CG-3000 Automatic Antenna Tuner," Specification, CG Antenna, Shanghai, China, http://www.onz.be/antennes/cg3000N.pdf, © 2004-2007.

* cited by examiner

SYSTEM AND METHOD FOR CONTROLLING ANTENNA TUNING USING AN AUXILIARY CHANNEL OF AN EMBEDDED DISPLAY PORT INTERFACE

CROSS REFERENCE TO RELATED APPLICATIONS

This application is a continuation of U.S. patent application Ser. No. 12/912,195, entitled "System and Method for Controlling Antenna Tuning Using an Auxiliary Channel of an Embedded Display Port Interface," filed on Oct. 26, 2010, the disclosure of which is hereby expressly incorporated by reference in its entirety.

FIELD OF THE DISCLOSURE

This disclosure relates generally to information handling systems, and more particularly relates to a system and method for controlling antenna tuning using an auxiliary channel of an embedded display port interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system can include an antenna to provide wireless communication capabilities. Depending on the type of wireless communication used in the information handling system, there may be different frequency bands that the antenna can utilize to communicate data to and from the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
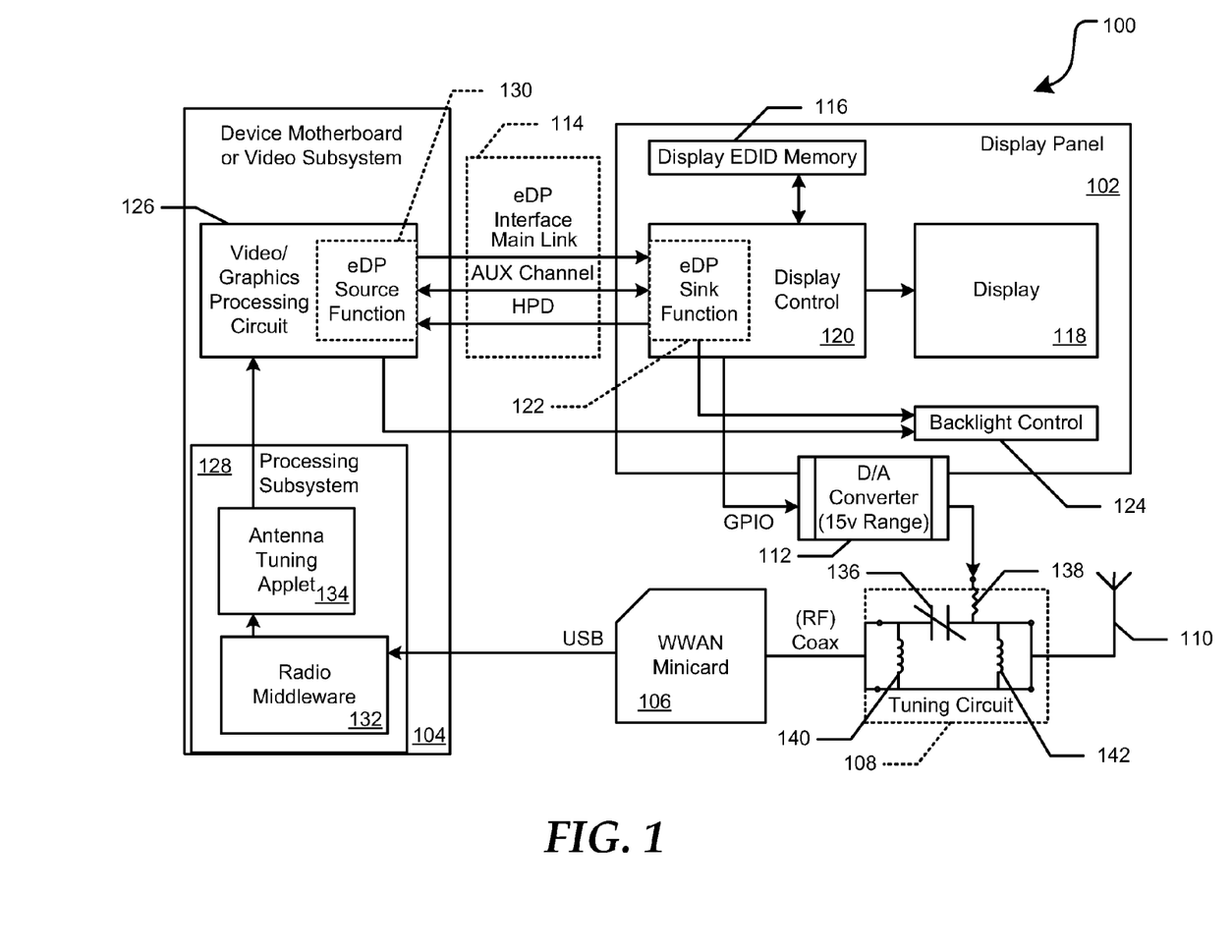
FIG. 1 is a block diagram of an information handling system.

FIG. 1 shows an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The information handling system 100 includes a display panel 102, a motherboard 104, a wireless wide area network (WWAN) minicard 106, a tuning circuit 108, an antenna 110, and a digital-to-analog (D/A) converter 112. The display panel 102 is in communication with the motherboard 104 via an embedded display port (eDP) interface 114. The display panel 102 is in communication with the D/A converter 112 via a general purpose input output (GPIO) bus. The motherboard 104 is in communication with the WWAN minicard 106 via a universal serial bus (USB).

The display panel 102 includes an extended display identification (EDID) memory 116, a display 118, a display control circuit 120, an eDP sink function 122, and a backlight control 124. The display control circuit 120 can include the eDP sink function 122, and is in communication with the D/A converter 112, with the display EDID memory 116, and with the display 118. The motherboard 104 includes a video/graphics processing circuit 126, a processing subsystem 128, and an eDP source function 130. The eDP sink function 122 is in communication with the eDP source function 130 via a main link channel, an auxiliary channel, and a hot plug detect channel of the eDP interface 114. The video/graphics processing circuit 126 is in communication with the backlight control 124. The processing subsystem 128 includes a radio middleware application 132 and an antenna tuning applet 134. The radio middleware application 132 is in communication with the WWAN minicard 106. The radio middleware application 132 is also in communication with the antenna tuning applet 134, which in turn is in communication with the video/graphics processing circuit 126.

The tuning circuit 108 includes a capacitor 136, a resistor 138, and inductors 140 and 142. The capacitor 136 includes first and second terminals. The resistor 138 includes a first terminal connected to the D/A converter 112, and a second terminal connected to the second terminal of the capacitor 136. The inductor 140 includes a first terminal connected to the first terminal of the capacitor 136 and to the WWAN minicard 106, and a second terminal connected to the WWAN minicard. The inductor 142 includes a first terminal connected to the second terminal of the capacitor 136 and to the antenna 110, and a second terminal connected to the second terminal of the inductor 140 and to the antenna.

The capacitor 136, the resistor 138, and the inductors 140 and 142 of the tuning circuit 108 can be configured to tune the antenna 110 to a specific frequency band for wireless communication. During operation, the WWAN minicard 106 can utilize the tuning circuit 108 and the antenna 110 to receive and/or transmit data during a wireless communication session of the information handling system 100. In different embodiments, the WWAN minicard 106 can be any wireless radio device, such as a radio device on the motherboard 104, that can receive and/or transmit data during a wireless communication session of the information handling system 100. The information handling system 100 can be any portable device with an antenna for wireless communication, such as a laptop computer, a tablet computer, a cellular telephone, a portable multimedia player, or the like. The WWAN minicard 106 can receive data from the antenna 110 via the RF coaxial cable and the tuning circuit 108. The antenna 110 can be variably tuned to provide the information handling system 100 with wireless coverage in frequency bands associated with a Long Term Evolution (LTE) wireless communication standard, such as LTE band (LTEB) 17 (700-746 Mega hertz MHz), LTEB 13 (746-787 MHz), GSM 850 MHz, and CDMA 900 MHz. The antenna 110 can be tuned to each of the different frequency bands by adjusting the resonance frequency of the antenna. Thus, the antenna 110 can be dynamically tuned, such that the resonance of the antenna can be set within a spectrum of a desired frequency band. The resonance frequency of the antenna 110 can be adjusted by changing the capacitance of the capacitor 136, which can be a Barium Strontium Titanate (BST) capacitor, a set of pin diodes, or the like. The BST capacitor can be a ferroelectric thin film capacitor that can require a high voltage to change the capacitance of the BST capacitor. The set of pin diodes can be cathode diodes pointing toward each other that are connected to a bias voltage to keep the diodes in an on state. The capacitance of the pin diodes can be adjusted with a low voltage based on changing a bias current provided to the pine diodes. The capacitance of the capacitor 136 can vary based on a voltage applied to the capacitor. Therefore, the resonance frequency of the antenna 110 can vary based on a change in the capacitance of the capacitor 136 as controlled by the voltage applied to the capacitor.

The antenna 110 can be initially set up so that the resonance frequency of the antenna is within one frequency band of the different frequency bands stated above. In this situation, if the D/A converter 112 does not provide a voltage to the capacitor 136, the antenna 110 can be tuned to the frequency band initially set for the antenna. However, if a voltage is provided to the capacitor 136, the antenna 110 can be tuned to either a higher or lower frequency band based on the design of the tuning circuit 108. Thus, the WWAN minicard 106 can communicate with another device via the frequency band to which the antenna 110 is initially tuned. However, if the WWAN minicard 106 determines that a new frequency band is to be utilized in the antenna 110, the WWAN minicard can cause the capacitance of the capacitor 136 to change, and cause the resonance frequency antenna to change to another frequency band.

The WWAN minicard 106 can use the radio middleware application 132 and the antenna tuning applet 134 to provide an antenna tuning control signal to the video/graphics processing circuit 126. The radio middleware application 132 can be an application programming interface (API) that can enable the WWAN minicard 106 to interact with and communicate with drivers of the motherboard 104, such as the eDP source function 130. Thus, the WWAN minicard 106 can send the antenna tuning control signal to the video/graphics processing circuit 126, which in turn can send the antenna tuning control signal across the auxiliary channel of the eDP interface 114 to the eDP sink function 122. When the antenna tuning control signal is detected in the eDP sink function 122, the display control circuit 120 can set a voltage on one or more port pins of the GPIO bus connecting the display control circuit to the D/A converter 112. When one or more voltages are detected on the port pins, the D/A converter 112 can output a voltage to the capacitor 136 based on the detected voltages of the port pins. The voltage can cause a change in the capacitance of the capacitor 136, and cause a change in the resonance frequency of the antenna 110.

For example, there may be four different frequency bands to which the antenna 110 can be tuned. The WWAN minicard 106 can send first, second, third, and fourth antenna tuning control signals to the video/graphics processing circuit 126 via the radio middleware application 132 and the antenna tuning applet 134. The first, second, third, or fourth antenna tuning control signal can then be sent from the eDP source function 130, across the auxiliary channel of the eDP interface 114, and to the eDP sink function 122 of the display control circuit 120. When the display control circuit 120 receives one of the first, second, third, or fourth antenna tuning control signals, the display control circuit can set a different port pin configuration on the GPIO bus based on the antenna tuning control signal received. In an embodiment, there can be two port pins of the GPIO bus, such that the port pins can be set to four different port pin configurations.

The D/A converter 112 can vary the voltage provided to the capacitor 136 and the resonance frequency of the antenna 110 based on the port pin configuration. The antenna 110 can then be tuned to one of the four frequencies stated above based on the voltage from the D/A converter 112. For example, if there is not a voltage applied to the capacitor 136, the antenna can have a first resonance frequency within one of the LTE frequency bands. When the D/A converter 112 applies one of three voltages to the capacitor 136, the resonance frequency of the antenna 110 can either increase or decrease depending on the design of the antenna and the tuning circuit 108. Thus, the resonance frequency of the antenna 110 can vary among the four different frequency ranges based on the antenna tuning control signal sent across the auxiliary channel of the eDP interface 114 to cause the D/A converter 112 to provide a desired voltage to the capacitor 136.

In another embodiment, the WWAN minicard 106 can utilize the radio middleware application 132 and the antenna tuning applet 134 to switch the resonance frequency between only two different resonance frequencies. The process of providing the antenna tuning control signal to cause the D/A converter 112 to apply a voltage to the capacitor 136 can be similar to that described above. However, the antenna tuning control signal can cause the D/A converter 112 to switch between on/off states, and can cause the antenna 110 to switch between the two resonance frequencies. While the tuning of a single antenna was described it should be understood that another antenna can be tuned between another group of frequency bands.

Figure 2:
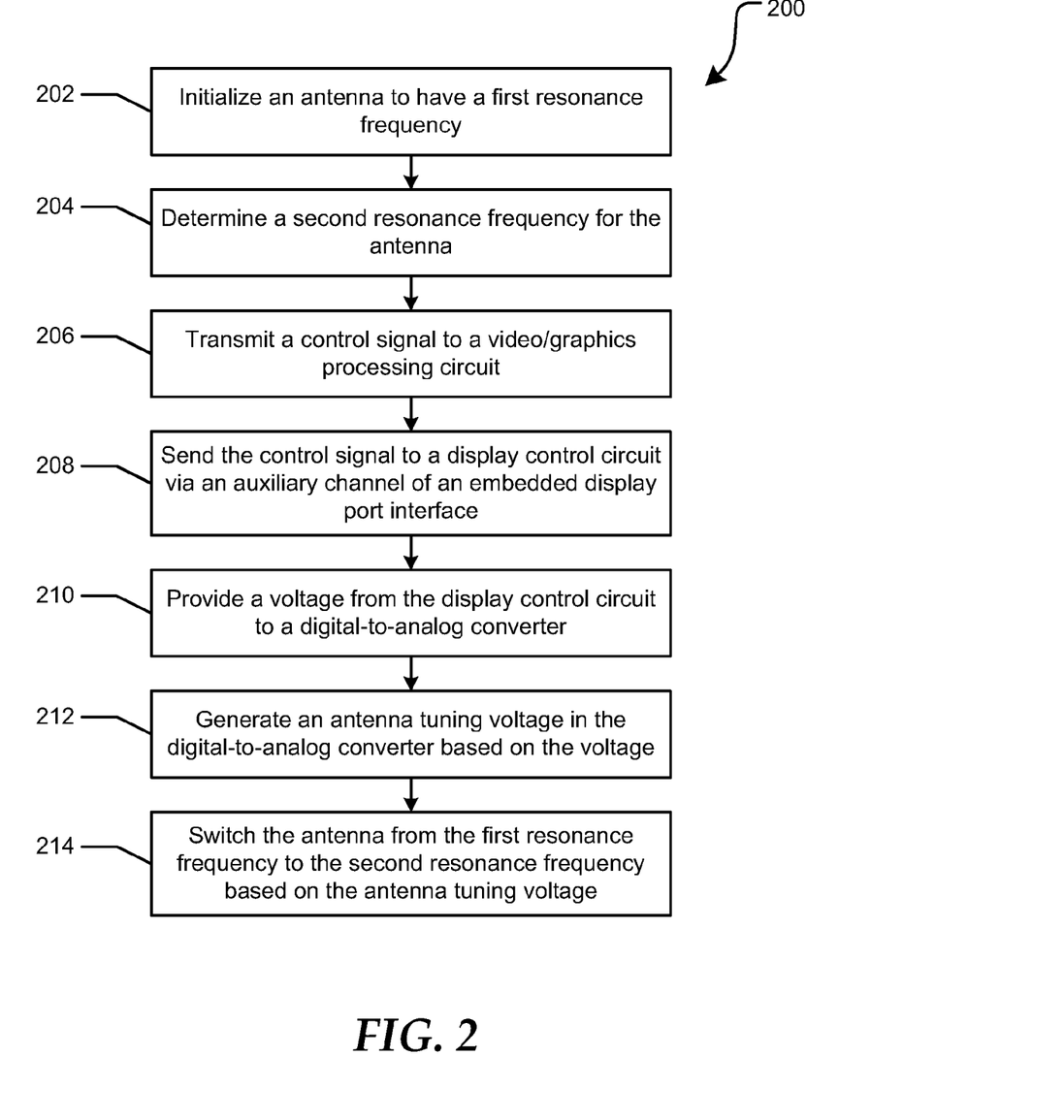
FIG. 2 is a flow diagram of a method for tuning an antenna via an auxiliary channel of an embedded display port interface.

FIG. 2 shows a flow diagram of a method 200 for tuning the antenna via the auxiliary channel of the eDP interface. At block 202, the antenna of the information handling system is initialized to have a first resonance frequency. The first resonance frequency can be within a first frequency band of a wireless communication standard. A second resonance frequency for the antenna is determined at block 204. The second resonance frequency can be within a second frequency band of the wireless communication standard. At block 206, a control signal is transmitted to a video/graphics processing circuit of the information handling system. The control signal can indicate a desired frequency band of the antenna. The control signal is sent from the video/graphics processing circuit to a display control circuit via an auxiliary channel of the eDP interface at block 208.

At block 210, a voltage is provided from the display control circuit to a digital-to-analog converter in response to the control signal received on the auxiliary channel of the eDP interface. An antenna tuning voltage is generated in the digital-to-analog converter based on the voltage from the display control circuit at block 212. At block 214, the antenna is switched from the first resonance frequency to the second resonance frequency based on the antenna tuning voltage.

Figure 3:
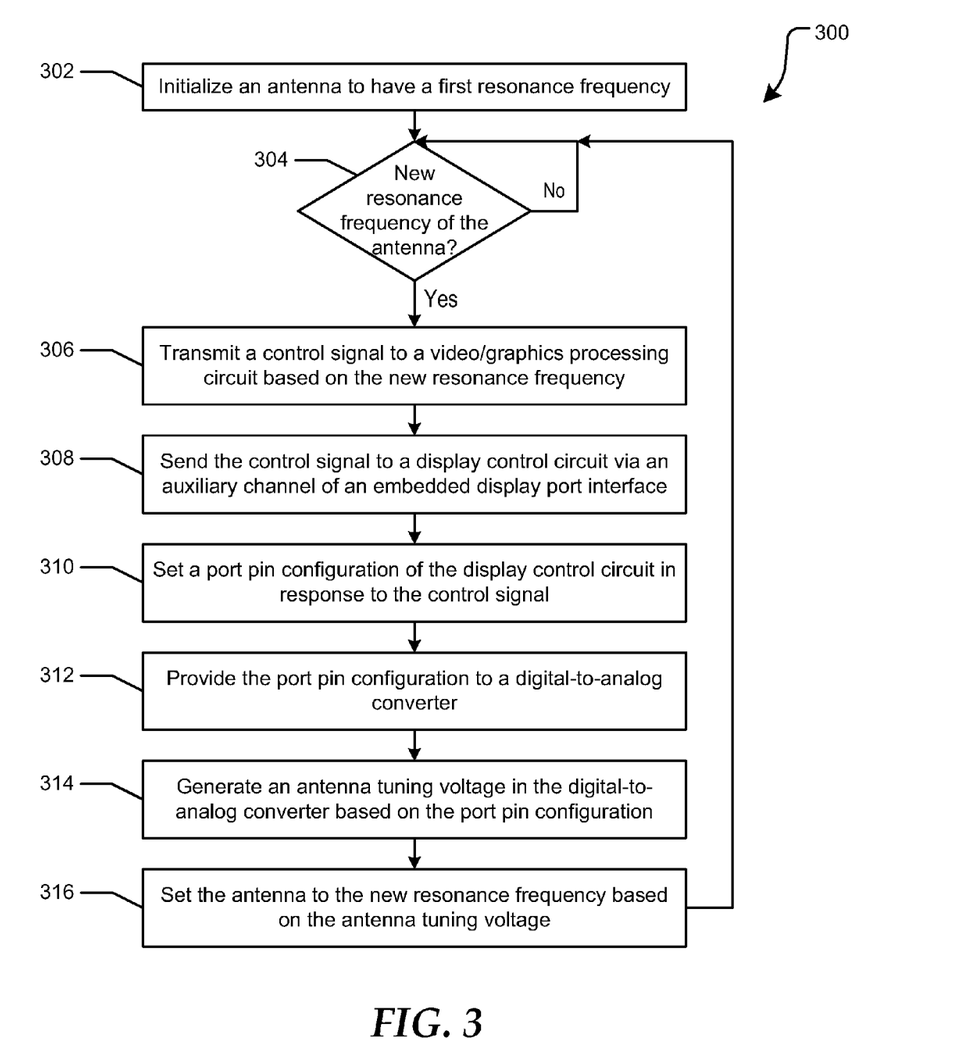
FIG. 3 is a flow diagram of another method for tuning the antenna via the auxiliary channel of the embedded display port interface.

FIG. 3 shows a flow diagram of another method 300 for tuning the antenna via the auxiliary channel of the eDP interface. At block 302, an antenna of an information handling system is initialized to have a first resonance frequency. The first resonance frequency can be within a first frequency band of a wireless communication standard. A determination is made whether a new resonance frequency for the antenna is selected at block 304. The new resonance frequency can be within second, third, or fourth frequency bands of the wireless communication standard. At block 306, when the new resonance frequency is selected, a control signal is transmitted to a video/graphics processing circuit of the information handling system. The control signal can vary based on the resonance frequency selected for the antenna. The control signal can indicate a desired frequency band of the antenna. The control signal is sent from the video/graphics processing circuit to a display control circuit via an auxiliary channel of the eDP interface at block 308.

At block 310, a port pin configuration of the display control circuit is set in response to the control signal received on the auxiliary channel of the eDP interface. At block 312, the port pin configuration is provided to a digital-to-analog converter. An antenna tuning voltage is generated in the digital-to-analog converter based on the port pin configuration from the display control circuit at block 314. At block 316, the antenna is set to the new resonance frequency based on the antenna tuning voltage, and the flow diagram can repeat as stated above at block 304.

Figure 4:
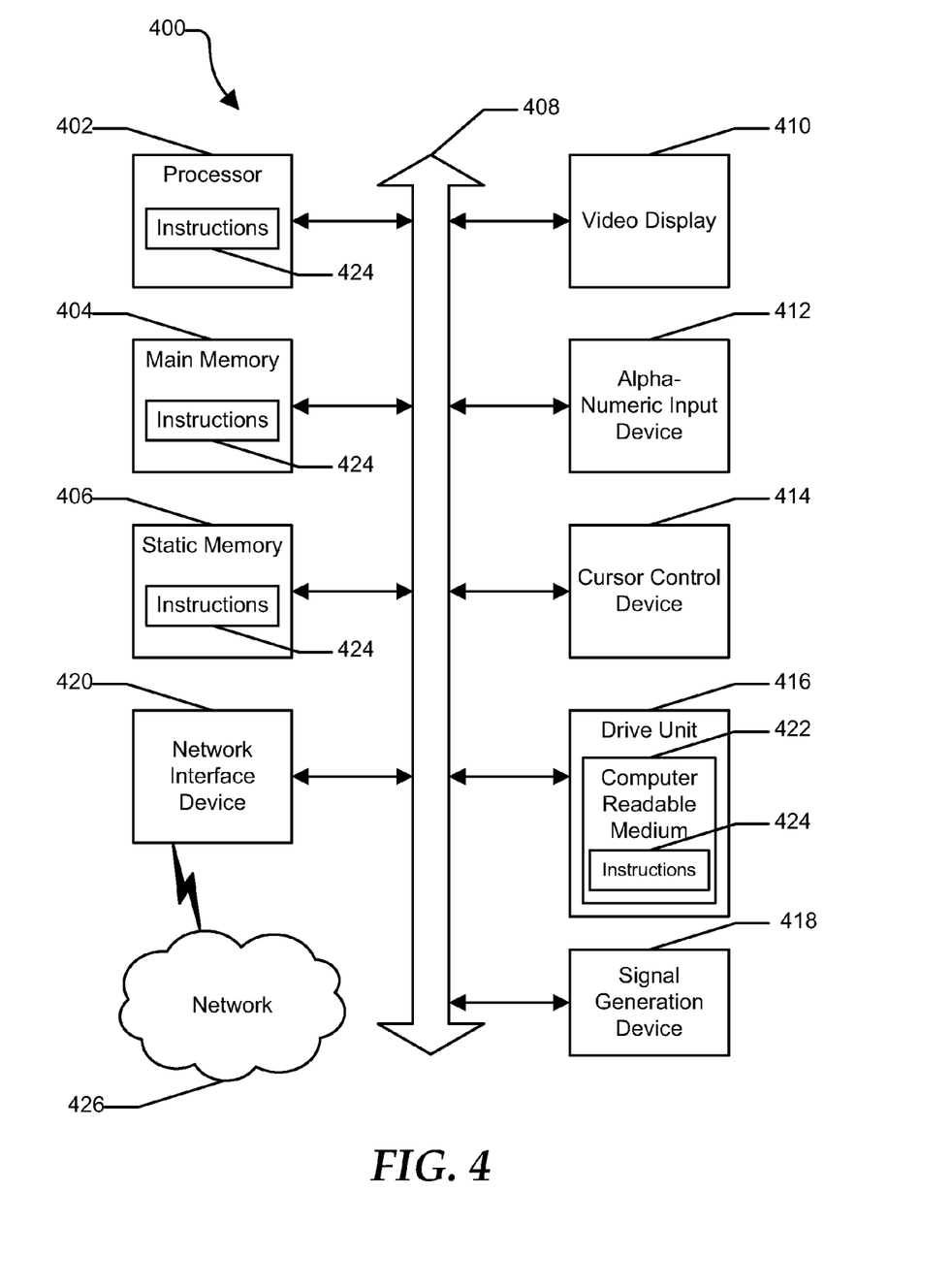
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402 such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424 such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a capacitor having a variable capacitance, wherein the variable capacitance of the capacitor varies based on a voltage applied to the capacitor;
an antenna coupled to the capacitor, the antenna having a variable resonance frequency, wherein the variable resonance frequency is based on the variable capacitance of the capacitor; and
an embedded display port interface configured to transmit the control signal to a display control circuit via an auxiliary channel of the embedded display port interface, wherein the control signal sets the voltage applied to the capacitor.

2. The information handling system of claim 1 further comprising:
a video/graphics processing circuit in communication with the display control circuit, the video/graphics processing circuit configured to transmit the control signal from the wireless wide area network card to the display control circuit via the auxiliary channel of the embedded display port interface.

3. The information handling system of claim 2 further comprising:
a wireless wide area network card in communication with the antenna, the wireless wide area network card configured to set the variable resonance frequency to a specific frequency based on the control signal;
a radio middleware application in communication in communication with the wireless wide area network card; and
an antenna tuning applet in communication with the radio middleware application and with the video/graphics processing circuit,
wherein the radio middleware application is an application programming interface configured to provide the wireless wide area network card with communication to drivers of the video/graphics processing circuit.

4. The information handling system of claim 1 further comprising:
a digital-to-analog converter in communication with the display control circuit, the digital-to-analog converter configured to provide the voltage to the capacitor in response to a signal from the display control circuit.

5. The information handling system of claim 1 wherein the antenna is configured to switch between two or more frequency bands based on the variable resonance frequency.

6. The information handling system of claim 5 wherein the frequency bands are low frequency bands for wireless communication.

7. The information handling system of claim 1 wherein an increase in the voltage applied to the capacitor cause the variable resonance frequency to increase.

8. The information handling system of claim 1 wherein an increase in the voltage applied to the capacitor cause the variable resonance frequency to decrease.

9. A method comprising:
initializing an antenna of an information handling system to have a first resonance frequency;
determining a second resonance frequency for the antenna;
sending a control signal to a display control circuit via an auxiliary channel of an embedded display port interface; and
switching the antenna from the first resonance frequency to the second resonance frequency based on the control signal received at the display control circuit via the auxiliary channel of the embedded display port interface.

10. The method of claim 9 wherein the first and second resonance frequencies are within different low frequency bands for wireless communication.

11. The method of claim 9 wherein the first resonance frequency is greater than the second resonance frequency.

12. The method of claim 9 wherein the second resonance frequency is greater than the first resonance frequency.

13. The method of claim 9 wherein the control signal is transmitted from a wireless wide area network card.

14. The method of claim 9 wherein the control signal indicates a desired frequency band of the antenna.

15. A method comprising:
initializing an antenna of an information handling system to have a first resonance frequency;
determining a second resonance frequency for the antenna;

sending a first control signal to a display control circuit via an auxiliary channel of an embedded display port interface;

setting a first port pin configuration of the display control circuit in response to receiving the first control signal on the auxiliary channel of the embedded display port interface; and setting the antenna to the second resonance frequency based on the first port pin configuration.

16. The method of claim 15 further comprising:

determining a third resonance frequency for the antenna;

sending a second control signal to the display control circuit via the auxiliary channel of the embedded display port interface;

setting a second port pin configuration of the display control circuit in response to the second control signal received on the auxiliary channel of the embedded display port interface; and setting the antenna the third resonance frequency based on the second port pin configuration.

17. The method of claim 16 wherein the second and third resonance frequencies are within different low frequency bands for wireless communication.

18. The method of claim 16 wherein the second resonance frequency is greater than the third resonance frequency.

19. The method of claim 16 wherein the third resonance frequency is greater than the second resonance frequency.

20. The method of claim 15 wherein the control signal is transmitted from a wireless wide area network card.

\* \* \* \* \*